US012781640B2

(12) United States Patent
Park et al.

(10) Patent No.: US 12,781,640 B2
(45) Date of Patent: Nov. 3, 2026

(54) SYSTEMS AND METHODS FOR PREVENTING LIBERATION AND DAMAGE TO AIRFOILS IN A GAS TURBINE

(71) Applicant: GE Infrastructure Technology LLC, Greenville, SC (US)

(72) Inventors: Junyoung Park, Greenville, SC (US); Jeffrey M Breznak, Schenectady, NY (US); Jon C. Schaeffer, Greenville, SC (US)

(73) Assignee: GE VERNOVA INFRASTRUCTURE TECHNOLOGY LLC, Greenville, SC (US)

( * ) Notice: Subject to any disclaimer, the term of this patent is extended or adjusted under 35 U.S.C. 154(b) by 0 days.

(21) Appl. No.: 18/675,913

(22) Filed: May 28, 2024

(65) Prior Publication Data

US 2025/0035011 A1 Jan. 30, 2025

Related U.S. Application Data

(63) Continuation of application No. 18/358,413, filed on Jul. 25, 2023, now Pat. No. 12,060,802.

(51) Int. Cl.
*F01D 25/00* (2006.01)
*F01D 5/28* (2006.01)

(52) U.S. Cl.
CPC ........... *F01D 25/007* (2013.01); *F01D 5/288* (2013.01); *F05D 2230/90* (2013.01); *F05D 2260/95* (2013.01); *F05D 2300/611* (2013.01)

(58) Field of Classification Search
CPC .......... F01D 5/28; F01D 5/286; F01D 25/007; F05D 2260/95
See application file for complete search history.

(56) References Cited

U.S. PATENT DOCUMENTS

| | | | | |
|---|---|---|---|---|
| 3,081,252 A * | 3/1963 | Preiser | F04D 7/06 | 204/196.19 |
| 3,441,491 A * | 4/1969 | George | C23F 13/10 | 204/196.15 |
| 10,267,165 B2 | 4/2019 | Zafiris et al. | | |
| 10,837,295 B2 | 11/2020 | Zafiris et al. | | |
| 2009/0176110 A1* | 7/2009 | Pabla | C23C 4/02 | 428/457 |
| 2014/0093367 A1* | 4/2014 | Parkin | F01D 5/28 | 415/208.1 |

(Continued)

FOREIGN PATENT DOCUMENTS

JP 2000204902 A 7/2000

*Primary Examiner* — Courtney D Heinle
*Assistant Examiner* — Cameron A Corday
(74) *Attorney, Agent, or Firm* — Eversheds Sutherland (US) LLP

(57) ABSTRACT

The present application provides a replaceable galvanic protection anode system for preventing and limiting the effects of liberation and damage to airfoils in a gas turbine, wherein turbine components are covered by a sacrificial material. The galvanic protection layer of the replaceable anodes may include a sacrificial material, such as aluminum, wherein the material provides corrosion resistance to the substrate. Additionally, the galvanic protection layer may include a sacrificial conductive material insert for increasing the conductivity of the sacrificial material and further improve the corrosion resistance of the replaceable anodes.

17 Claims, 3 Drawing Sheets

(56) References Cited

U.S. PATENT DOCUMENTS

| | | | | |
|---|---|---|---|---|
| 2015/0060273 | A1* | 3/2015 | Zhang | G01N 27/02<br>204/404 |
| 2015/0180145 | A1* | 6/2015 | Harvey | C23F 13/005<br>439/40 |
| 2015/0354376 | A1* | 12/2015 | Garosshen | C23F 13/08<br>416/241 R |
| 2016/0208813 | A1* | 7/2016 | Zafiris | F04D 29/324 |
| 2017/0121828 | A1* | 5/2017 | Simpson | C23F 13/20 |
| 2018/0202299 | A1* | 7/2018 | Murdock | F04D 29/023 |

* cited by examiner

SYSTEMS AND METHODS FOR PREVENTING LIBERATION AND DAMAGE TO AIRFOILS IN A GAS TURBINE

CROSS-REFERENCE TO RELATED APPLICATION

This application is a Continuation of U.S. patent application Ser. No. 18/358,413, filed Jul. 25, 2023, which is hereby incorporated by reference in its entirety.

TECHNICAL FIELD

The present disclosure relates generally to gas turbine engines and more particularly relates to systems and methods for preventing and limiting the effects of liberation and damage to airfoils in a gas turbine.

BACKGROUND

Gas turbines are conventionally made of two distinct sections: a compressor section and a turbine section. The compressor section takes in air, or another suitable gas, and compresses it volumetrically. The turbine section mixes the flow of compressed air that comes from the compressor section of the gas turbine with a flow of fuel to generate hot combustion gases. A turbine in the turbine section receives the flow of hot combustion gases from the combustor and extracts energy from the gases for powering the compressor and for outputting power to an external load such as an electrical generator and the like. In the compressor section there are a multitude of airfoils connected around a central shaft which rotates, enabling the airfoils to compress the ambient air as it is pulled into the compressor. For example, there may be around 19 stages of compressor airfoil sections within the compressor section.

When a gas turbine engine is idling, or not in constant motion, water may condense on the surface of the airfoils, casing, and other parts in the compressor section. This condensation typically includes corrosive elements, and the water acts as an electrolyte facilitating corrosion. Thus, the accumulation and constant contact of water and corrosive elements on the compressor parts initiates corrosion of the parts, more specifically the airfoils. This corrosion presents in the form of pits, or "pitting," which may dramatically affect the overall airflow characteristics of the compressor. The depth of these corrosion pits often measures up to about 20 millimeters and may result in a fracture surface or fracture line where there is a greater chance of liberation (i.e., destruction by detaching of all or part of the airfoil). Liberation of a single airfoil is often responsible for destruction of one or several other airfoils, and these airfoils may be ejected from the gas turbine and cause injury to nearby persons. Vibrations within the gas turbine when it is in-use or not idling can often act as a crack expander and thereby exacerbate the issues creates by these pits. Given the severity of liberation of airfoils, these airfoils often have to be replaced as a whole to ensure no further catastrophic issues.

Previous attempts at reducing or eliminating pitting caused by condensation and/or corrosive elements focus on up-stream air intake. These solutions generally involve air filtration to remove impurities in the air such that condensation on the airfoils includes relatively pure water. However, these air filters are expensive and have a short lifetime.

Another existing method of minimizing corrosion pits is through galvanic protection of the airfoils. This galvanic protection layer helps to protect the substrate from corrosive environments, and helps to ensure that there is an electrically conductive path between the galvanic protection layer and the steel substrate. Such galvanic protection layers may be made of sacrificial materials, like aluminum or other electrically conductive materials. Conventionally, this galvanic protection layer is applied as a coating to the entire surface of each individual airfoil. However, the galvanic protection layer coating may degrade the surface finish over time and reduce the overall efficiency of the compressor because the surface finish itself may form pits or gaps in the coating which roughen the surface of the airfoil. Additionally, it is expensive and time consuming to repair this coating since every portion of each airfoil must be inspected to identify the magnitude and location of damage to the galvanic protection layer coating.

Accordingly, improved corrosion inhibitors for reducing or elimination the formation of pits on the surface of gas turbine airfoils are needed for overcoming one or more of the technical challenges described above.

SUMMARY

Mitigating degradation due to the galvanic protection coating may be achieved through the use of replaceable anodes made of the sacrificial material. These anodes may take a variety of different shapes and can be located at specific locations on turbine components to improve the corrosion resistance without reducing the efficiency of the compressor or degrading the finish of the substrate. Furthermore, the individual airfoils, and each stage of airfoils as a whole, can be modified in their shape, orientation, and design to better direct condensed water to the anodes and create a more efficient corrosion-prevention system. This galvanic protection layer therefore increases the resistance of the turbine components to corrosion and other damaging effects caused by corrosion, such as pitting, and the anode prevents degradation of the surface finish caused by the galvanic protection layer, enabling the airfoils and other turbine components to function safely for longer time periods between maintenance or replacements.

These and other features and improvements of this application and the resultant patent will become apparent to one of ordinary skill in the art upon review of the following detailed description when taken in conjunction with the several drawings and the appended claims.

BRIEF DESCRIPTION OF THE DRAWINGS

The detailed description is set forth with reference to the accompanying drawings. The use of the same reference numerals may indicate similar to identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Figure 1:
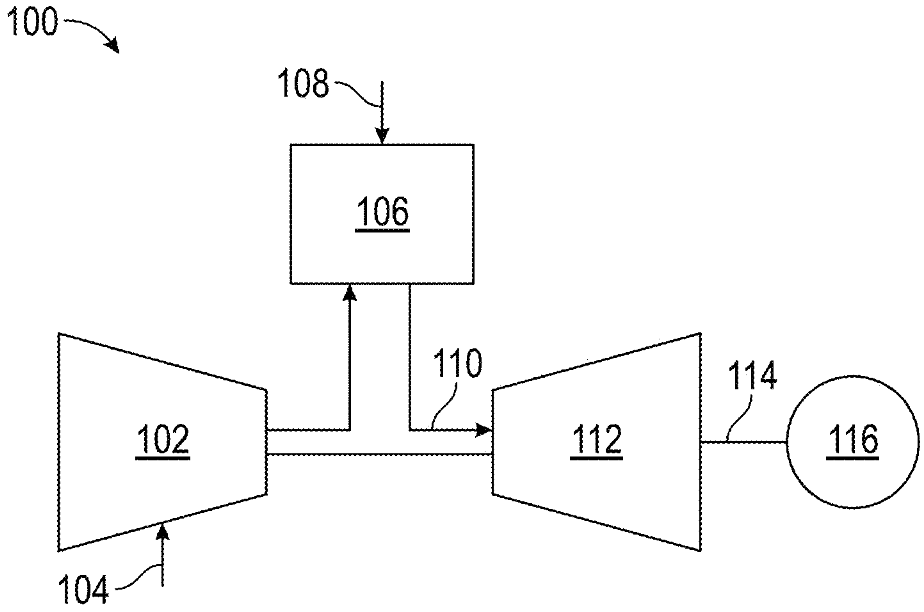
FIG. 1 is a schematic diagram of a gas turbine engine including a compressor, a combustor, a turbine, and an external load.

This disclosure relates generally to gas turbines and turbine protection systems for reducing the effects of corrosion and turbine damage. In some instances, the turbine protection system includes at least one airfoil engaged with a compressor. As used herein, an "airfoil" is an aerodynamic body configured to generate lift as air passes over the surface of the airfoil. The compressor of gas turbines typically include dozens of compressor blades in the form of both "rotor blades" and "stator vanes," and these compressor blades are typically separated into the "airfoil" portion that is responsible for compressing air, and a "base" portion responsible for coupling the airfoil to the compressor shaft. However, in the interest of brevity, the term "airfoil" is used herein to refer to the entire compressor blade of either the rotor or stator. Although rotor blades and stator vanes may vary in shape depending on the desired airflow characteristics through a compressor, the protection system described herein may be implemented on rotors or stators of any shape.

In some embodiments, the at least one airfoil includes a blade, a platform, a dovetail, and a base. The "blade" of the airfoil is the characteristic wing-shaped portion responsible for compressing air when the airfoil is in motion as part of a compressor. The "base" or root of the airfoil, typically characterized by a curved joint, represents the portion of the airfoil where the blade joins the platform. The "platform" of the airfoil generally defines the radially inner boundary of the air flow path across the blade surface. When a number of airfoils are positioned together on the compressor disk, the platforms of each airfoil approximate a smooth cylindrical surface. The "dovetail" of the airfoil is configured to join the airfoil to the compressor disk; the eponymous dovetail-shape is configured to secure the airfoil in the compressor disk such that, when the compressor spins, the dovetail experiences a higher pressure and more secure fitting within the compressor disk.

In some embodiments, the turbine protection system includes one or more anodes attached to the airfoil. The anode may be attached to any suitable portion of the airfoil, including the platform, base, dovetail, or blade, depending on the corrosion-prevention needs of the particular turbine and/or airfoil. In some embodiments, the one or more anodes includes a sacrificial material configured to provide galvanic protection against corrosion. The sacrificial material may be positioned between the anode and the airfoil. In some embodiments, the anode is formed from aluminum, zinc, magnesium, lithium, or a combination thereof.

In some embodiments, the sacrificial material is formed from aluminum, zinc, magnesium, or a combination thereof. Without intending to be bound by any particular theory, it is believed that the inclusion of a sacrificial material such as aluminum, zinc, or magnesium encourages corrosion of the sacrificial material instead of the airfoil itself. By including an anodic material, it has been unexpectedly discovered that the sacrificial material may be significantly reduced in size without compromising the corrosion inhibition properties. For example, conventional corrosion inhibition techniques involve coating the entire airfoil in a sacrificial material. By including an anode, corrosion may be further encouraged to selectively affect the sacrificial material rather than the airfoil without impacting the aerodynamic surface of the airfoil. In embodiments in which the anode is incorporated within the surface of the airfoil, i.e., in substitution of the airfoil material otherwise present, the anode has the same mass as the portion of the airfoil, platform, dovetail, or other compressor component that the anode is being inlaid in substitution for.

In some embodiments, the turbine protection system further includes a conductive material coated onto the sacrificial material between the sacrificial material and the anode. In some embodiments, the conductive material includes bronze, iron, brass, or an alloy thereof. Without intending to be bound by any particular theory, it is believed that the inclusion of a conductive material on the sacrificial material enhances the ability for the anode to promote corrosion of the sacrificial material.

In some embodiments, the conductive material is attached through the use of an adhesive, a mechanical securing means such as a screw or bolt, or manufactured as part of the anode with the sacrificial material. This conductive material may be of the same or different thickness and/or 0 shape as the sacrificial material. Without intending to be bound by any particular theory, it is believed that having a differently shaped or different thickness conductive material as compared to the sacrificial material may allow for increased effectiveness in directing the water to the sacrificial material. In some embodiments, the conductive material is attached above the sacrificial layer and is shaped to have channels, grooves, gaps, or holes. In other embodiments, the conductive material is attached below the sacrificial material. By including the conductive material below the sacrificial layer, the duration of corrosion-prevent effects may be enhanced because, as the sacrificial layer begins to corrode, the conductive material may supplement the anodic attraction of corrosive elements in the condensed water.

In some embodiments, the anode is detachably attachable to the airfoil. It has been unexpectedly discovered that forming the turbine protection system from one or more anodes capable of being detachably attached enables the ability to add one or more anodes in any particular position on the airfoil in order to reduce or substantially eliminate corrosion of the airfoil. Furthermore, the anode may be removed at any convenient time, such as during a period of planned downtime, without requiring the sacrificial material to be fully corroded, ensuring the anodes have the optimal degree of corrosion prevention at any given time.

In some embodiments, the anode is attached using an adhesive. In some embodiments the adhesive includes epoxy, polyurethane, cyanoacrylate, anaerobic adhesives, silicone, or acrylic adhesives. For example, the portion of the anode is coated with epoxy and is inlaid in the platform such that the top surface of the anode is sitting flush with the surface of the platform. Furthermore, it may be preferable in some embodiments for the adhesive to be first applied to the surface of the compressor component. In some other embodiments, a portion of the anode is designed to have grooves or channels configured to guide the application of the adhesive. In other embodiments, the adhesive is an industrial tape. For example, the adhesive may include polyimide tape or self-fusing silicone tape.

In some embodiments, the anode is attached to the airfoil or other compressor component through notched protrusion which connects into a groove or channel. For example, the anode may comprise a small protrusion having a rectangular shape and the airfoil may comprise an opening in a cavity having a complementary shape to the protrusion on the anode such that the protrusion may be inserted into the opening and moved, rotated, or translated into a secondary position in the cavity such that the connection is secure. In other embodiments, the protrusion is rectangular, square, angled, or trapezoidal. In some embodiments, there are multiple protrusions on the anode, and multiple openings and cavities on the airfoil, such that every protrusion aligns with an opening. In some embodiments, the various openings and protrusions have the same shape such that the anodes may be positioned in any corresponding opening. In other embodiments, each anode has a unique protrusion configured to be inserted into exactly one corresponding opening, such as when the anode is shaped and/or sized to produce anti-corrosive effects in a particular location on the airfoil.

In some embodiments, the anode is attached to the airfoil or other compressor component through a threaded component. In some embodiments, the anode includes male or a female threaded portion, parallel threads, tapered threads, or multi-start threads, and the airfoil or other compressor component includes a complementary portion of the threaded system. By including a threaded system to the anode and compressor component, the system may provide simpler method of attaching and detaching the anodes. In some embodiments, different anodes may have different thread types or thread sizes, wherein the thread is specific to the anode's attachment at a specific location on the airfoil or other compressor component. In some embodiments, the threaded component is a vibration resistant screw. In some embodiments, the threaded component is combined with a threadlocker, such as an adhesive that is applied to the threads, of either the compressor component or the anode. In some embodiments, some anodes have a protrusion/opening means of securing to the airfoil, while some anodes are attached using a threaded means.

In some embodiments, the anode is attached to the airfoil or other compressor component using a magnetic connection. In some embodiments the magnetic connection includes at least two permanent magnets, which may include neodymium iron boron, samarium cobalt, alnico, or ceramic/ferrite magnets. In some embodiments, the magnetic connection includes at least one temporary magnet. For example, a temporary magnet, such as a soft iron device, may be attached to the anode and may engage with another magnet, either temporary, permanent, or electromagnetic, attached to the airfoil or other compressor component. In some embodiments, the magnetic connection includes electromagnets. In some embodiments, a solenoid contained within the airfoil or other compressor component may be used to attach an anode that includes a magnetic component.

In some embodiments, the anode is machined to be a part of the airfoil, platform, dovetail, or other compressor component. By incorporating the formation and attachment of the anode in the manufacturing process of the airfoil or other compressor component, installation of the anode may be greatly simplified.

In some embodiments, the anode is comprised of multiple layers of different material. For example, the anode may include a base layer made of a non-sacrificial material and a top layer including the sacrificial material. By including a base layer, the anode may be more easily attached to the airfoil or other compressor component. For example, the base layer may be machined to have a notch that engaged within the airfoil or platform enabling the anode to be easily attachable and detachable. The base layer may include an adhesive component, a female thread port, a male thread port, a carbon plate, or another suitable attachment method. In some embodiments, there are multiple layers of different sacrificial material within the anode. Without intending to be bound by any particular theory, it is believed that an anode having at least two layers of different sacrificial material may be able to corrode at a reduced rate. For example, the top layer may include aluminum and a bottom layer may include magnesium. In some embodiments, the layers may be of the same or different thicknesses and/or shapes. In some embodiments, a layer of the conductive material may be added to the anode to increase the effectiveness of the anode. For example, a conductive layer may be positioned between the top layer and the bottom layer. In another example, the conductive layer may be positioned on top of both the top layer and the bottom layer. In another example, the conductive layer may be positioned only on top of the top layer. This conductive layer may be of the same or different thickness and/or shape as the sacrificial material layer.

In some embodiments, the airfoils, casing, platform, turbine, or other parts of the compressor section of the gas turbine are shaped to direct water towards the anodes, or may include shaped features configured to direct water towards the anodes. By shaping the components of the compressor section to direct water towards the anodes, the turbine can more effectively move water away from the airfoils and non-anode components and further reduce the chance of those components corroding. For example, the components, such as the airfoil, may have channels carved into them that do not affect the overall performance or effectiveness of the compressor, but nonetheless facilitate the redirection of condensed water to one or more anodes. These channels may be added after the airfoil has been manufactured through a secondary process, or the channel may be machined into the airfoil during the manufacturing process. In some embodiments, these channels or other forms of directing water from the components can be specifically designed for different anode placements. For example, different channels may be present that each redirect water to a different anode. In some embodiments, different airfoils within an airfoil stage of the compressor have different channels. By directing the water in different directions for different airfoils within an airfoil stage, the channels can better use the force of gravity to direct the water to the anodes. As described above, water may condense and enable corrosion when the turbine is idle or disengaged, i.e., when the airfoils are not rotating. Thus, an airfoil that is angled horizontally from the central shaft when the turbine is disengaged may use channels that direct the water diagonally toward an anode of the platform, whereas an airfoil that is angled downward from the central shaft may use channels that direct the water downward toward an anode on the tip of the airfoil.

In some embodiments, the anode may be sized and shaped to fit into specific portions of the airfoil, dovetail, platform, or other compressor parts. For example, the anode may have a top surface which is circular, rectangular, trapezoidal, square, trigonal, rhombus, or a comparable shape. By having the anode be able to be different shapes and sizes, the anode can be more effectively attached to different compressor components because each part has different shapes, angles, locations, and sizes. In some embodiments, the anode has multiple levels of elevation to match the curvature of the platform. In some embodiments, the anode has grooves, channels, or other surface design. By including texture to the surface of the anode, the anode may have increased effectiveness in some embodiments as the sacrificial material will corrode more readily and in a more precise pattern.

In some embodiments, the anode is attached to the tip of the airfoil. By including an anode on tip of an airfoil, the airfoil can utilize the effects of gravity to help direct water to the anode. When idling or shutdown, some airfoils are facing downwards from the central shaft, it is therefore preferable in some embodiments to have the anode on the tip of the airfoil.

In some embodiments, there are multiple anodes attached to different locations of the airfoil, platform, dovetail, or other compressor component. By including multiple anode locations, the anodes can more effectively direct the water on the airfoil or components to the sacrificial material. Furthermore, in some instances an airfoil, when the gas turbine is idling or shutdown, may point in different directions away from the central shaft at different times. It therefore may be preferable to have anodes at different locations along the airfoil or other compressor component so that the water may be directed to a more preferable anode based on proximity and direction.

In some embodiments, the anode is attached to the inside of the casing of the compressor. Some compressors include airfoils that are in constant contact with the casing, or the separation between the airfoils and the casing is small enough for the water to contact the anodes from the tip of the blade. Without intending to be bound by any particular theory, it is believed that attaching anodes inside the casing of the compressor may allow for more efficient corrosion prevention in instances where the condensed water collects at the tip of the airfoil or is transferred from the tip of the airfoil to the inside casing of the compressor.

Referring now to the drawings, in which like numerals refer to like elements throughout the several views, FIG. 1 shows a schematic diagram of a gas turbine engine 100 as may be used herein. The gas turbine engine 100 may include a compressor 102. The compressor 102 compresses an incoming flow of air 104. The compressor 102 delivers the compressed flow of air 104 to a number of combustor cans 106. The combustor cans 106 mix the compressed flow of air 104 with a pressurized flow of fuel 108 and ignite the mixture to create a flow of hot combustion gases 110. Although only a single combustor can 106 is shown, the gas turbine engine 100 may include any number of combustor cans 106 positioned in a circumferential array and the like. Alternatively, the combustor 106 may be an annular combustor. The flow of combustion gases 110 is in turn delivered to a turbine 112. The flow of combustion gases 110 drives the turbine 112 to produce mechanical work. The mechanical work produced in the turbine 112 drives the compressor 102 via a rotor shaft 114 and an external load 116 such as an electrical generator and the like.

The gas turbine engine 100 may use natural gas, various types of syngas, liquid fuels, and/or other types of fuels and blends thereof. The gas turbine engine 100 may be any one of a number of different gas turbine engines offered by General Electric Company of Schenectady, New York, including, but not limited to, those such as a 7-series or a 9-series heavy duty gas turbine engine and the like. The gas turbine engine 100 may be part of a simple cycle or a combined cycle power generation system or other types of generation systems. The gas turbine engine 100 may have different configurations and may use other types of components. Other types of gas turbine engines also may be used herein. Multiple gas turbine engines, other types of turbines, and other types of power generation equipment also may be used herein together.

Figure 2:
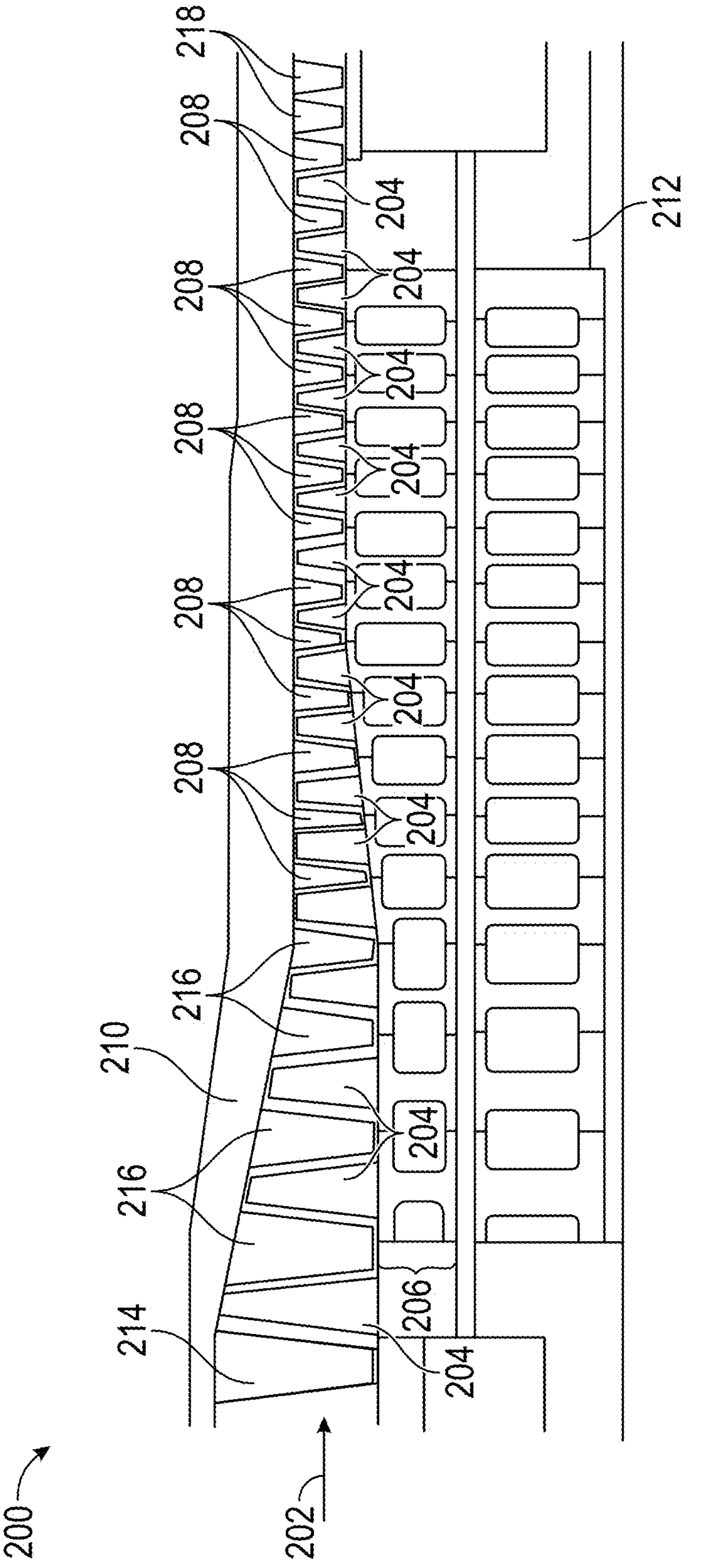
FIG. 2 is a schematic diagram of a compressor that may be used with the gas turbine engine of FIG. 1.

FIG. 2 shows an example of the compressor 200. The compressor 200 may include a number of compressor stages, also referred to as rotor/stator stages, with an axial compressor flow path 202 therethrough. The exact number of rotor and stator stages may be a matter of engineering design choice and may be more or fewer than the illustrated stages. It is to be understood that any number of rotor and stator stages may be provided herein.

Each stage of the compressor 200 may include a number of circumferentially spaced rotor blades 204 mounted on a rotor wheel 206 and a number of circumferentially spaced stator vanes 208 attached to a static compressor case 210. Each of the rotor wheels 206 may be attached to an aft drive shaft 212, which may be connected to the turbine section of the engine. The rotor blades and stator vanes may lie in the flow path 202 of the compressor 200. The direction of airflow through the compressor flow path 202 flows generally from left to right in FIG. 2. Other components and other configurations may be used herein.

The compressor rotor blades 204 impart kinetic energy to the airflow and therefore bring about a desired pressure rise. Directly following the rotor blades 204 may be a stage of the compressor stator vanes 208. However, in some designs the stator vanes may precede the rotor blades. Both the rotor blades and stator vanes turn the airflow, slow the airflow velocity (in the respective airfoil frame of reference), and yield a rise in the static pressure of the airflow. Typically, multiple rows of rotor/stator stages are arranged in axial flow compressors to achieve a desired discharge to inlet pressure ratio. Each rotor blade and stator vane includes an airfoil as described herein, and these airfoils can be secured to rotor wheels or a stator case by an appropriate attachment configuration, often known as a “root,” “base” or “dovetail”. In addition, the compressor 200 also may include inlet guide vanes (IGV’s) 214, variable stator vanes (VSV’s) 216, and exit or exhaust guide vanes (EGV’s) 218. All of these blades and vanes have airfoils that act on the medium (e.g., air) passing through the compressor flow path 202. Thus, all of the airfoils on the blades and vanes described in FIG. 2 may be susceptible to pitting as a result of moisture and/or corrosion. Other components and other configurations may be used herein.

Figure 3:
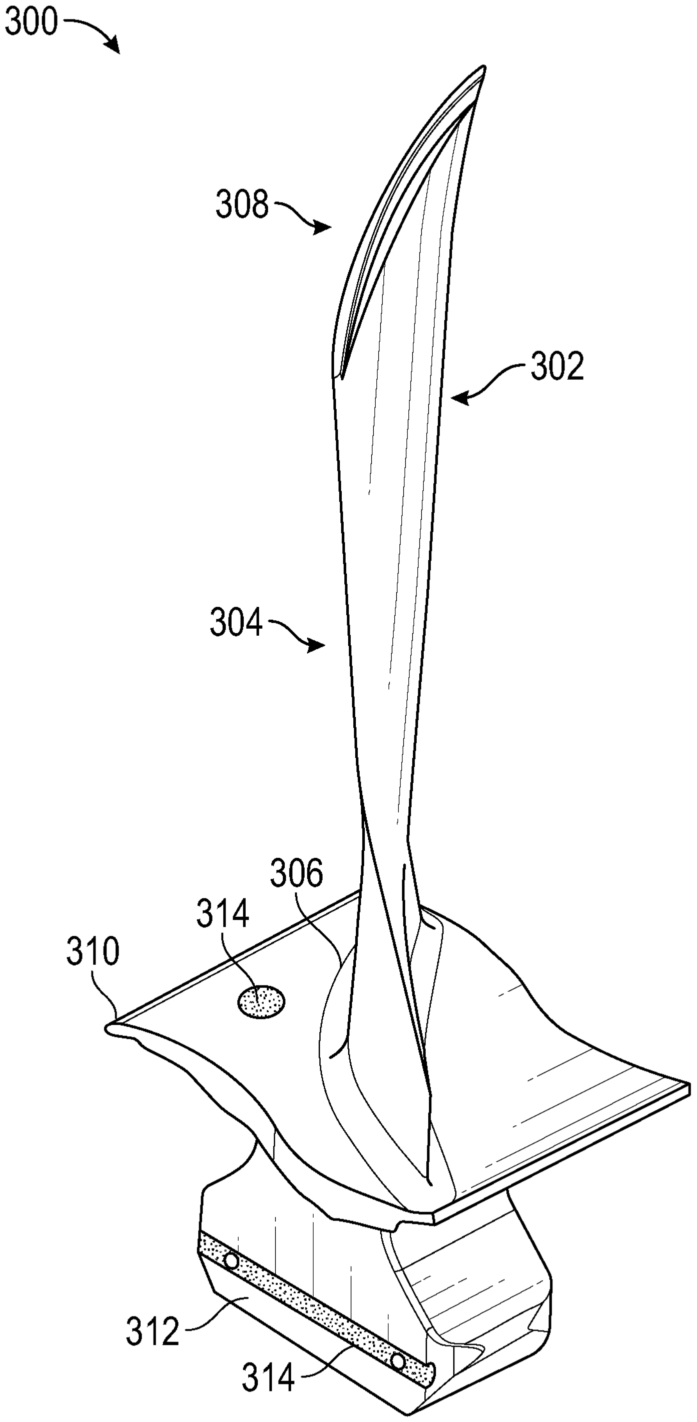
FIG. 3 is a perspective view of an airfoil that may be used with the turbine of the gas turbine engine of FIG. 1 and/or the compressor of FIG. 2.

FIG. 3 shows an exemplary rotor blade or airfoil 300 that may be incorporated into the compressor of FIG. 2 in one or more of the rotor blade(s), stator vane(s), variable stator vane(s), and/or exit or exhaust guide vane(s). The airfoil 300 extends from an axially forward leading edge 302 to an axially aft trailing edge 304 and from a radially inward base or root 306 to a radially outer tip 308. The airfoil 300 includes a platform 310 defining a radially inner boundary of a gas path. The airfoil 300 also includes a dovetail 312. The airfoil 300 also illustrates an anode 314 positioned on the platform 310, as well as an anode 314 on the dovetail 312.

Modifications and variations of the methods and devices described herein will be obvious to those skilled in the art from the foregoing detailed description. Such modifications and variations are intended to come within the scope of the appended claims. It should be apparent that the foregoing relates only to certain embodiments of the present application and that numerous changes and modifications may be made herein by one of ordinary skill in the art without departing from the general spirit and scope of the disclosure.

Although specific embodiments of the disclosure have been described, numerous other modifications and alternative embodiments are within the scope of the disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

We claim:

1. A turbine protection system for reducing the effects of corrosion and turbine damage by reducing corrosion of at least one component engaged with a compressor of the turbine, wherein the at least one component comprises an airfoil, a platform that defines a radially inner boundary of a gas path through the compressor, a dovetail, and a base, the turbine protection system comprising:

one or more anodes comprising a first sacrificial material detachably attached to the component; and at least one sacrificial layer comprising a second sacrificial material disposed between and in direct contact with the one or more anodes and a surface of the component, the at least one sacrificial layer configured to provide galvanic protection against corrosion.

2. The turbine protection system of claim 1, wherein the first sacrificial material comprises aluminum, zinc, magnesium, lithium, or a combination thereof.

3. The turbine protection system of claim 1, further comprising a conductive material coated on the second sacrificial material.

4. The turbine protection system of claim 1, further comprising a conductive material disposed between the at least one sacrificial layer and at least one of the one or more anodes.

5. The turbine protection system of claim 3, wherein the conductive material comprises bronze, iron, brass, or an alloy thereof.

6. The turbine protection system of claim 1, further comprising an adhesive for attaching the anode to the component.

7. The turbine protection system of claim 1, wherein the anode further comprises a protrusion and the component further comprises a groove, wherein the protrusion is configured to mate with the groove to secure the anode to the component.

8. The turbine protection system of claim 1, wherein the anode further comprises a first threaded portion and the component further comprises a second threaded portion, wherein the first and second threaded portions are configured to mate to secure the anode to the component.

9. The turbine protection system of claim 1, wherein the anode further comprises a magnet configured to secure the anode to the component.

10. The turbine protection system of claim 1, wherein the at least one anode is attached to the platform in the gas path.

11. The turbine protection system of claim 1, wherein the turbine protection system comprises two or more anodes, and wherein at least one anode is attached to the base.

12. The turbine protection system of claim 1, wherein the anode further comprises a textured surface configured to corrode in a predictable and precise pattern.

13. The turbine protection system of claim 1, wherein the second sacrificial material comprises aluminum, zinc, magnesium, or a combination thereof.

14. The turbine protection system of claim 1, wherein the anode is attached to a distal end of the airfoil.

15. The turbine protection system of claim 1, further comprising one or more anodes attached to an inside surface of a compressor casing.

16. A method for reducing corrosion on gas turbine components, the method comprising:

attaching a sacrificial layer in direct contact with a surface of a component engaged with a compressor of the gas turbine, wherein the component comprises an airfoil comprising a platform that defines a radially inner boundary of a gas path through a turbine, a dovetail, and a base, and attaching an anode in direct contact with the sacrificial layer, wherein the anode is detachable, wherein the anode comprises a first sacrificial material, and wherein the sacrificial layer comprises a second sacrificial material.

17. The method of claim 16 wherein the sacrificial layer and anode are attached to the platform in the gas path.

* * * * *